(12) United States Patent
Sherlock et al.

(10) Patent No.: US 8,584,195 B2
(45) Date of Patent: Nov. 12, 2013

(54) IDENTITIES CORRELATION INFRASTRUCTURE FOR PASSIVE NETWORK MONITORING

(75) Inventors: Kieran Gerard Sherlock, Palo Alto, CA (US); Geoffrey Howard Cooper, Palo Alto, CA (US); John Richard Guzik, San Jose, CA (US); Derek Patton Pearcy, San Francisco, CA (US); Luis Filipe Pereira Valente, Palo Alto, CA (US)

(73) Assignee: McAfee, Inc, Santa Clara, CA (US)

( * ) Notice: Subject to any disclaimer, the term of this patent is extended or adjusted under 35 U.S.C. 154(b) by 1272 days.

(21) Appl. No.: 11/854,392

(22) Filed: Sep. 12, 2007

(65) Prior Publication Data

US 2008/0109870 A1     May 8, 2008

Related U.S. Application Data

(60) Provisional application No. 60/864,925, filed on Nov. 8, 2006.

(51) Int. Cl.
*H04L 29/06* (2006.01)
*G06F 17/00* (2006.01)
*G06F 7/04* (2006.01)
*G06F 17/30* (2006.01)
*G06F 15/16* (2006.01)

(52) U.S. Cl.
USPC ............... 726/1; 726/2; 726/3; 726/4; 726/5; 726/6

(58) Field of Classification Search
USPC ........................................................ 726/1–6
See application file for complete search history.

(56) References Cited

U.S. PATENT DOCUMENTS 6,505,245 B1 * 1/2003 North et al. ............... 709/223
6,816,973 B1 * 11/2004 Gleichauf et al. ......... 726/13

(Continued)

FOREIGN PATENT DOCUMENTS

CA    2572528 A1    6/2007
EP    1054529 A2    11/2000

(Continued)

OTHER PUBLICATIONS

U.S. Appl. No. 12/454,773, Restriction Requirement mailed Nov. 3, 2011, 9 pgs.

(Continued)

*Primary Examiner* — Taghi Arani
*Assistant Examiner* — Jahangir Kabir
(74) *Attorney, Agent, or Firm* — Wong, Cabello, Lutsch, Rutherford & Brucculeri, LLP

(57) ABSTRACT

User names and user groups serve as the basis of a formal policy in a network. A passive monitor examines network traffic in near real time and indicates: which network traffic is flowing on the network as before; which users or user groups were logged into workstations initiating this network traffic; and which of this traffic conforms to the formal policy definition. In one embodiment of the invention, users and user groups are determined by querying Microsoft® Active Directory and Microsoft® Windows servers, to determine who is logged onto the Microsoft® network. Other sources of identity information are also possible. The identity information is then correlated with the network traffic, so that even traffic that does not bear on the Microsoft® networking scheme is still tagged with identity

27 Claims, 8 Drawing Sheets

(56) References Cited

U.S. PATENT DOCUMENTS

| | | | |
|---|---|---|---|
| 7,958,238 B1* | 6/2011 | Batz et al. | 709/225 |
| 2003/0023711 A1* | 1/2003 | Parmar et al. | 709/223 |
| 2004/0263315 A1* | 12/2004 | Kim et al. | 340/5.7 |
| 2006/0277184 A1 | 12/2006 | Faitelson et al. | |
| 2007/0150934 A1* | 6/2007 | Fiszman et al. | 726/1 |
| 2010/0067390 A1 | 3/2010 | Pereira et al. | |

FOREIGN PATENT DOCUMENTS

| | | |
|---|---|---|
| WO | WO-0203219 A1 | 1/2002 |
| WO | WO-2008044225 A2 | 4/2008 |
| WO | WO-2009142751 A2 | 11/2009 |
| WO | WO-2009142751 A3 | 3/2010 |

OTHER PUBLICATIONS

European Application Serial No. 09750982.2, Office Action Response Filed Aug. 16, 2011, 7 pgs.

International Application Serial No. PCT/US2009/003161, International Preliminary Report on Patentability mailed Sep. 10, 2010, 23 pgs.

International Application Serial No. PCT/US2009/003161, Partial International Search Report mailed Sep. 1, 2009, 5 pgs.

International Application Serial No. PCT/US2009/003161, Search Report mailed Feb. 1, 2010, 10 pgs.

International Application Serial No. PCT/US2009/003161, Written Opinion mailed Feb. 1, 2010, 14 pgs.

Jain, A K, et al., "Data clustering: a review", ACM Computing Surveys vol. 31, No. 3, ISSN: 0360-0300, (Sep. 1, 1999), 264-323.

Jitian, X, et al., "Measuring similarity of interests for clustering Web-users", Database Conference ADC Proceedings, ISBN: 978-0-7695-0966-2, (Jan. 29, 2001), 107-114.

Komlodi, A, et al., "A User-centered Look at Glyph-based Security Visualization", Visualizations for Computer Security, IEEE Workshop, ISBN: 978-0-7803-9477-3, (Oct. 26, 2005), 3 pgs.

* cited by examiner

IDENTITIES CORRELATION INFRASTRUCTURE FOR PASSIVE NETWORK MONITORING

CROSS-REFERENCE TO RELATED APPLICATIONS

This application claims priority to U.S. Patent Application Ser. No. 60/864,925 filed 8 Nov. 2006.

NOTE WITH REGARD TO REFERENCES

Throughout this application, various documents are referenced in parentheses, e.g. [REF], which references correspond to documents which are identified by the citations set forth in "Table 3. References." These references are not considered necessary to understand or practice the invention disclosed herein and are only included as a convenient mechanism for providing background information that may be of interest to the reader.

BACKGROUND OF THE INVENTION

1. Technical Field

The invention relates to network monitoring. More particularly, the invention relates to the collection, distribution, and correlation of user identities with network addresses for use in connection with passive monitoring of network traffic pursuant to a corporate policy.

2. Description of the Prior Art

As the Internet expands into all aspects of business, companies must implement their business rules as policies on their internal network. Companies also incur risks to their business from intruders, both internal and external, who use the networks as a medium of attack. Existing security tools are able to monitor network activity and determine certain kinds of attacks against company infrastructure. Others can examine traffic passively and describe how it varies from company policies/controls, in near real time or by examining system logs and other forensic data. However, existing tools differ from corporate policies in a very important way, i.e. the tools describe machine behavior in terms of network address, and the policies describe user behavior in terms of user names, user groups, and user roles. Unfortunately, the network address provides a limited level functionality with regard to such user names, user groups, and user roles. It would therefore be advantageous to provide a method and apparatus that allowed correlation of user identity with network address, for example, in connection with the enforcement of a corporate policy, in a way that permits the tool to make decisions about network traffic in near real time, based on these identities.

In the identity management area, prior art from Microsoft® [NAP] and Cisco [NAC] associate user identity with network attachment. These technologies use an integration of an authentication protocol, such as 802.1x [802.1x], with the network switch to determine which user is connected to which switch port. A policy for admission to the network is then applied to the user name. These characteristics overlap this invention. However, the policy is limited to admission only. The user's activity is not tracked after connection, and a behavioral policy is not associated with the user. The invention extends protection provided by the prior art by monitoring and correlating the non-authenticated network behavior of users with their previously established identities for the duration of their network presence. The invention also provides this protection without need to upgrade network infrastructure, e.g. switches and authentication systems, to include new capabilities.

Security Event Management (SEM) systems aggregate security log information into a centralized database and search it on demand. These systems are able to associate user identity with network address, such as IP address. These techniques overlap some embodiments of the invention by using security event log information to user and network address information. Unlike the invention, SEM systems do not monitor network behavior; do not uniformly apply policy to network behavior, and are not able to synthesize logout information.

Prior policy languages [SPL] and policy development software [PDSTUDIO] provide mechanisms for describing network behavior based on IP address. This invention builds on this characteristic to extend policy monitoring to user and group identities.

SUMMARY OF THE INVENTION

The invention provides a scheme that allows user names and user groups to serve as the basis of a formal policy. Then, a passive network monitor examines network traffic in near real time, i.e. information flows about events within a small delay of the real time of those events, labeled with their actual time, such that the flow of events is equivalent to a real-time event flow. As a result, the passive network monitor indicates:

Which network traffic is flowing on the network;

Which users were logged into workstations initiating this network traffic, and to which user groups these users belong, as well as the identity of computers initiating or receiving this network traffic, where these users and/or computers have previously authenticated to the network authentication infrastructure. In the preferred embodiment of the invention, users and user groups are determined by querying a Microsoft® Active Directory and Microsoft® Windows servers, to determine who is logged onto the Microsoft® network [AD]. In this embodiment, computer identities are also represented as special user accounts associated with authenticated computers on the network. Other sources of identity information are also possible. The identity information is then correlated with the network traffic, so that even traffic that does not bear on the Microsoft® networking scheme is still tagged with identity, on the assumption that network traffic from a workstation is caused by the users who are logged in to said workstation;

Which of the said authenticated computers is receiving this network traffic; and Which of this traffic conforms to the formal policy definition.

The presently preferred embodiment of the scheme comprises the following components:

An Identity Acquisition Manager (IAM) module, which is a software subsystem that determines which users are logged into computers on the network. The IAM distributes this information to one or more remote network monitors. Thus, one aspect of this invention provides a scheme for obtaining a mapping from IP address to user identity in a distributed network monitoring system. The scheme uses a source of network identities, such as a network authentication system. In some embodiments, the scheme may overlap known schemes by looking at security log information from the network authentication system. However, such known schemes only provide logon information. In a distributed system, there is likely no logout information available at all.

Accordingly, the novel system herein disclosed synthesizes logout information using a combination of timeouts and both identity aware and non-identity aware remote probing techniques. The IAM also maintains the authenticated identity of computers on the network, using a feature of some network authentication systems whereby computers have a special user name allocated for them and are authenticated to the network at boot time. These are known in the IAM as authenticated computers. The IAM also has a distributed replication mechanism that permits multiple passive network monitors to keep up to date copies of the centralized IAM mapping.

A Distributed Logon Collector (DLC), which is a software subsystem that performs queries into network identities sources under control of the IAM. One or more DLC's permit the IAM to access multiple identity sources. The DLC provides a distributed and scalable mechanism to perform this access without placing undo burden on the network transport. In particular, the user can place one DLC at each network site, so that the DLC performs queries within the site and reports back to the IAM with summarized results more appropriate to distribution over a wide area network (WAN).

An Identity-enhanced Policy Development tool (Studio) that allows the operator to describe formal policies about network connections between machines when described by, for example:

Machine IP address;
Authenticated computer identity;
Authenticated computer group identity;
User identity;
User group identity; and
Combinations of the above.

The Studio knows how to query the network directory to obtain user and user group information. Custom groups may also be created and managed in the Studio. Groups may contain user identities, user group identities, or machine identities. The Studio maintains a ranking of policy relationships that establishes a priority system amongst them.

An Identity-enhanced policy engine, that reads policy from Studio and uses it to annotate a near real time description of the traffic with policy results, referred to herein as Outcomes.

The invention thus provides an identity-enabled policy monitoring system. A policy language is enhanced with the ability to write policy about users, authenticated computers and user or computer groups. The network monitor uses the IAM's distributed replication service to cause the current mapping from IP address to identity to be on hand at all times. The policy language uses this mapping to apply policy.

The mapping from IP address to identity affects the selection of applicable relationships from within the policy during evaluation. The selection is made, for example, using a ranking of identity policy objects in the policy. For example, in a situation where multiple relationships might apply to a given monitored connection:

a single user identity on the source computer causes relationships from user or user group to IP address to be preferred;
multiple user identities or a single computer identity causes relationships from authenticated computer or computer group to IP address to be preferred; and
an empty identity mapping causes relationships from IP address to IP address to be preferred.

An additional feature of the invention is that new IP addresses seen by the policy engine cause transactions to be delayed in the network monitor, e.g. for a few seconds, e.g. 7-14 seconds, to give the IAM time to update the identities for a new host appearing on the network.

The invention also provides a report showing traffic from group to select computers which may represent critical business systems. This embodiment of the invention comprises a matrix display with larger and smaller bubbles and includes colors for policy.

DETAILED DESCRIPTION OF THE INVENTION

Figure 1:
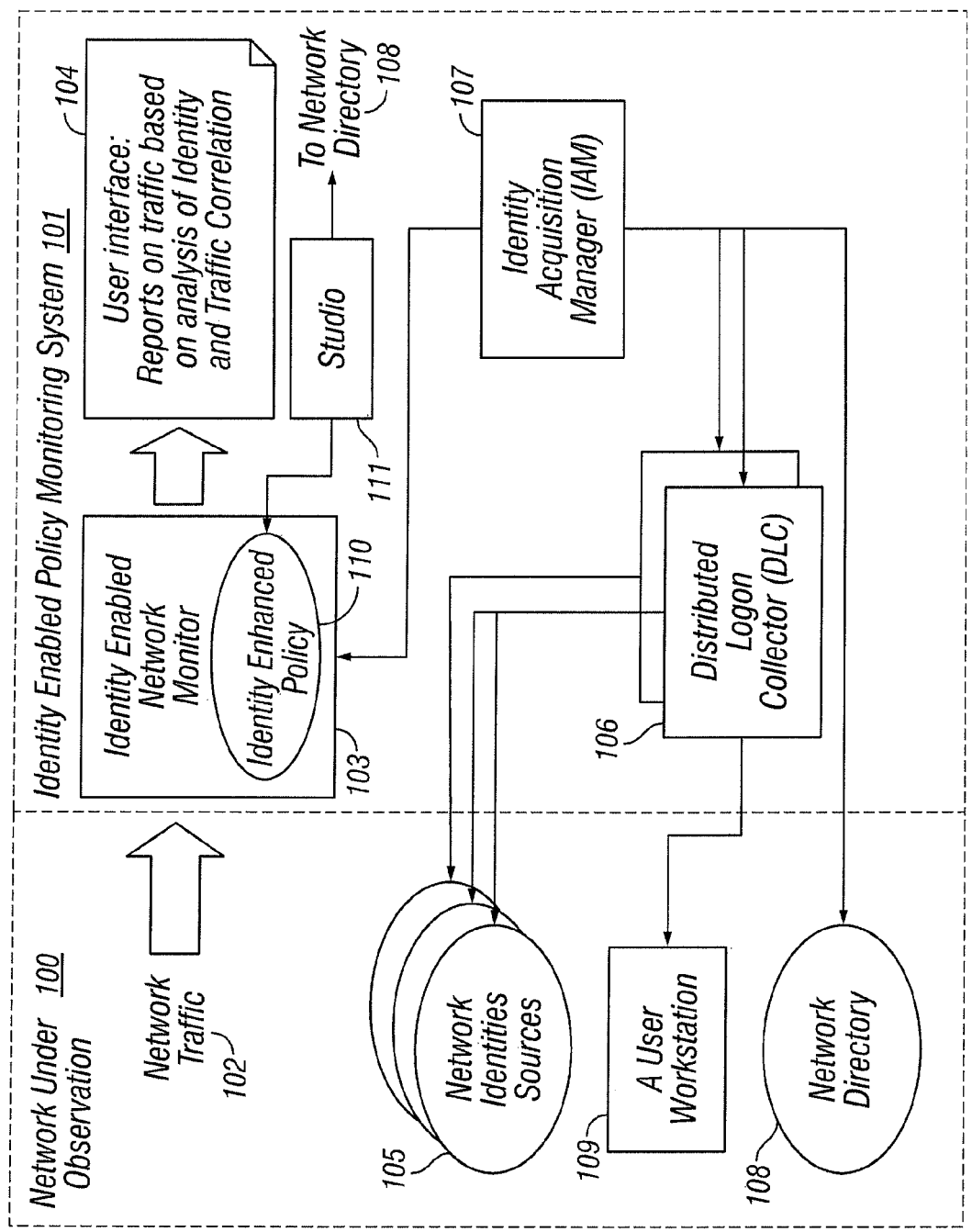
FIG. 1 is a block schematic diagram of an identities correlation infrastructure for passive network monitoring according to the invention.

Glossary of Terms
The following terms, used herein, have the associated definition given in the table below.

TABLE 1

| Glossary of Terms | |
|---|---|
| Term | Definition |
| Active Directory (AD) | [AD] Network directory and network authentication scheme from Microsoft ®, Inc., comprising both a Domain Controller component, responsible for authenticating domain users, and a repository of information about network entities such as users, groups, resources and machines (computers and printers), as well as the access rights granted to these entities (policy). The active directory implements one or more Domains, into which computers and users authenticate. The active directory is accessed as a network directory using the LDAP [LDAP] protocol. |

TABLE 1-continued

Glossary of Terms

| Term | Definition |
|---|---|
| Addressable network object | Studio object comprising, directly or indirectly, an IP address space. Examples are computer hosts, subnets, network interfaces and the top-level network objects (Intranet, Extranet, etc.) as defined in [PDSTUDIO]. |
| Authenticated computers | A computer which has authenticated to the network authentication system. An authenticated computer is treated as a user of the computer network. An example is a computer which is a member of an Active Directory Domain, and authenticates to its computer object within the Active Directory; this computer object is a kind of user object. |
| DDNS | [DDNS] Dynamic DNS. A mechanism whereby a host may insert its own name into the domain name system [DNS] when it comes up on the network. The network mechanism used is an option of the DHCP protocol [DHCP] and the particular DNS server in use. |
| DHCP | [DHCP] The Dynamic Host Configuration Protocol, a protocol that dynamically serves IP addresses to hosts on the network. Under usual DHCP deployments, hosts on the network are assigned IP addresses from a pool as they arrive on the network, so that the same IP address might be used for different hosts at different times, and the same host might receive a different IP address on subsequent connection to the network. |
| DNS | [DNS] The Domain Name System, a mechanism whereby names are assigned to IP addresses and served out to hosts on demand. |
| Host | In Studio, a particular kind of Addressable Network Object that represents one or more computers on the network. |
| Identity | The network logon of a user, computer or process. |
| Identity Acquisition Agent (IAA) | A component of the network monitor that maintains a set of user logon data replicated from the Identity Acquisition Manager (IAM). The IAA serves identity information to the Identity Acquisition Client (IAC). |
| Identity Acquisition Client (IAC) | A component of the network monitor responsible for mapping IP addresses into identity objects. The IAC serves identity information to the policy engine. To provide this service the IAC communicates with an Identity Acquisition Agent (IAA) in the network monitor which, in turn, communicates with an Identity Acquisition Manager (IAM) system elsewhere in the network. |
| Identity Acquisition Manager (IAM) | The component of this invention which collects user logon information from the network authentication system and distributes it to diverse network monitors for processing by policy engines. |
| Identity address space | The set of IP addresses know to be covered by the network authentication system. In a typical network, this is the set of "local" or "intranet" addresses. Many IP addresses that appear on the network are external to this address space, especially if they come in from the Internet. |
| Identity Aware Probe | A remote network probe that hooks into the authentication software within a workstation, such that it can query whether a given user is logged on or obtain the set of users that are currently logged on. An example is a remote Registry probe in the Microsoft ® Network [AD]. |
| Identity Enhanced Policy | A policy where network objects can include identity objects. See POLICY, NETWORK OBJECT |
| Identity Object | Studio object that represents a user, authenticated computer, user group, or computer group. See full description in text. |
| Identity-enabled policy monitoring system | This invention. A system which gathers information on user logons from the local network authentication system and distributes that information to network monitors. The network monitors are furnished with an identity enhanced policy that indicates the expected traffic based on Relationships. The network monitors correlate authentication information with IP address information to interpret the policy in near real time. |
| IP address | An address within the Internet Protocol [IP]. In IPv4, currently in common use, this is a 32-bit number, usually formatted as a.b.c.d, where a, b, c, and d are numbers from 0 to 255 and represent most to least significant bytes of the address. In some embodiments, IP address refers to Internet Protocol Version 6 addresses [IPv6], which are 128-bit numbers, formatted as 8 hexadecimal groups concatenated with the colon character. |
| Kerberos | [KERBEROS] A protocol that uses a trusted third party technique to distribute keys to Internet hosts [IP]. The Kerberos protocol is used as the primary logon protocol for |

TABLE 1-continued

Glossary of Terms

| Term | Definition |
|---|---|
| | the Microsoft ® Active Directory [AD] network authentication system. |
| LDAP | [LDAP] A protocol for accessing information from a network directory over a network. The Microsoft ® Windows Active Directory includes LDAP servers on each Domain Controller. |
| LDAP Server | A component of a network directory that is accessed over the network using the LDAP protocol. |
| Login | See Logon |
| Logon | The authentication of a user or computer to a network authentication system. The terms "login" and "logon" are interchangeable in the literature. |
| Logon state object | An object within the IAM that is maintained over time to indicate the users, authenticated computers, user groups and computer groups that are currently logged on to a computer with a particular IP address. The IAM also replicates the logon state objects into one or more network monitors over the network. |
| Multi-user computer | A computer that currently exhibits multiple user logons, or a computer that has been configured in an identity-enhanced policy language to always be considered as if it had multiple user logons. Network traffic attributed to this computer may come from any of the logged on users, so special treatment of this case is desirable in the invention. |
| NAT | [NAT] Network Address Translation. A technique whereby Internet Protocol [IP] packets are processed as they enter and exit a network to translate their addresses between an "inside" address domain and an "outside" address domain. Commonly, the "inside address" is local to a specific site, and the "outside" address is unique within the Internet, with one outside address shared amongst many inside addresses. In this invention, the key issue with network address translation is that it may cause two different computers to appear to have the same IP address. |
| Network authentication system | A system for authenticating users in a distributed computer network. An example is the Microsoft ® Active Directory [AD]. |
| Network Directory | A repository of information about network resources, and a network service that maps unique names into such information as a service for hosts on the network. Typically, a network directory maps user names or binary identifiers to authentication information about the user accounts, typically using the LDAP [LDAP] protocol. The network directory is usually a key component of a network authentication system. The Microsoft ® Active Directory [AD] contains within it an LDAP-accessible network directory, i.e. an LDAP server. |
| Network identity source | A computer accessible via a network that contains within it information about users and computers who have logged on to a network authentication system. An example is the security event log of a Microsoft ® Active Directory Domain Controller [AD]. |
| Network monitor | A device that passively receives packets transmitted across a network and interprets these packets as protocol information. The network monitor in this invention uses an identity enabled policy language description of traffic to classify the protocol information in near real time. In some embodiments, the packets may contain flow information from a router or switch. |
| Network object | [PDSTUDIO] An object in Studio representing one or more computers, users, user groups and/or computer groups on a network. Network objects can serve as initiators or targets of network traffic within the identity enhanced network policy. Network objects that are specified only by IP address are known as addressable network objects. |
| Network Probe | A network transaction, usually at the transport protocol level, which serves to detect the presence or absence of a computer at a particular IP address. Examples include the ICMP echo request [ICMP] and a TCP SYN packet [TCP]. Other kinds of packets may also be used. |
| Outcome | [PDSTUDIO] A policy result, consisting of a user-defined name and a severity, e.g. HIGH, MEDIUM, WARNING, OK. In the preferred embodiment, Outcomes contain a vector of severities, each with an attached protocol behavior, e.g. HTTP GET versus PUT. See RELATIONSHIP, SERVICE, STUDIO |
| Policy | A list of relationships that describe the behavior of entities within a computer network. See RELATIONSHIP, IDENTITY ENHANCED POLICY |

TABLE 1-continued

Glossary of Terms

| Term | Definition |
| --- | --- |
| Policy engine | A process that interprets a policy in a policy language [SPL] against network traffic information, resulting in a correlation of traffic to policy and a classification of traffic according to policy. |
| Policy language | [SPL] A formal description of network traffic that indicates whether traffic is intended to be permitted or not. In this invention, the policy language is also aware of how user identities, authenticated computer identities and groups are allowed to use the network. |
| Policy monitoring system | A network monitor that classifies and correlates traffic according to the interpretation of the traffic by a policy written in a policy language. Such a network monitoring system is described in [MONITOR]. |
| Relationship | [PDSTUDIO] A tuple <Initiator, Target, Service, Outcome> that defines the policy when the initiator network object connects to the target network object using protocols described within Service, causing the policy result to be the specified Outcome. See NETWORK OBJECT, OUTCOME, SERVICE, STUDIO |
| Service | [PDSTUDIO] A description of a protocol on the network, such as a transport protocol running on one or more ports or an application protocol which has been recognized through deep packet inspection. See RELATIONSHIP, OUTCOME, STUDIO |
| Studio | [PDSTUDIO] A program used to generate network security policy that describes the intended network traffic in terms of Relationships. See RELATIONSHIP |
| TCP | [TCP] The Transmission Control Protocol, a mechanism for transmitting a bi-directional, reliable stream of data between cooperating processes on the Internet. |
| UDP | [UDP] The User Datagram Protocol, a mechanism for transmitting packets between cooperating processes on the Internet. UDP enhances the Internet protocol with checksums for packet data and source and destination port numbers. UDP has no mechanisms for reliability, ordering or flow control. |
| Windows Registry | A mechanism within Microsoft ® Windows computers for mapping hierarchical strings to numbers or strings. Used for the static and dynamic configuration of the operating system and user programs. In this invention, the Windows Registry is mentioned as a source of information which an identity aware probe may access to obtain a list of users currently logged on to a Microsoft ® Windows operating system. |

Terminology—Acronyms

The following acronyms, used herein, have the associated definition given in the table below.

TABLE 2

Acronyms

| AD | Active Directory |
| --- | --- |
| DC | Domain Controller |
| DLC | Distributed Logon Collector |
| DUA | Directory User Agent |
| IAA | Identity Acquisition Agent |
| IAC | Identity Acquisition Client |
| IAM | Identity Acquisition Manager |
| IDDS | IDentity Data Store |
| LC | Logon Collector |
| LDAP | Lightweight Directory Access Protocol |
| LSM | Logon State Manager |

TABLE 2-continued

Acronyms

| SID | Security Identifier, unique identifier for AD objects (users, groups, computers) |
| --- | --- |
| DNS | Domain Name System |
| DDNS | Dynamic DNS |
| DHCP | Dynamic Host Configuration Protocol |
| LDAP | Lightweight Directory Access Protocol |
| NAT | Network Address Translation |
| UDP | User Datagram Protocol |
| IP | Internet Protocol |
| ICMP | Internet Control Message Protocol |

References

The following references in Table 3 below, identified throughout this document in parentheses, refer to the documents which correspond thereto in Table 3.

TABLE 3

References

| 802.1x | IEEE Standard 802.1X - 2004, Port Based Network Access Control. December, 2004 [SH95298] |
| --- | --- |

TABLE 3-continued

References

| | |
|---|---|
| AD | Microsoft ® Windows 2000 Active Directory Programming Charles Oppermann, Microsoft ® Press 2001 ISBN 0-7356-1037-1 |
| DDNS | RFC2136, Dynamic Updates in the Domain Name System (DNS UPDATE). P. Vixie, Ed., S. Thomson, Y. Rekhter, J. Bound. April 1997. (available from www.ietf.org) |
| DHCP | RFC2131, Dynamic Host Configuration Protocol. R. Droms. March 1997 (available from www.ietf.org) |
| DNS | RFC1035, Domain names - implementation and specification. P. V. Mockapetris. November 1987. (available from www.ietf.org) |
| IP | RFC0791, Internet Protocol. J. Postel. September 1981. (available from www.ietf.org) |
| IPv6 | RFC2460, Internet Protocol, Version 6 (IPv6) Specification. S. Deering, R. Hinden. December 1998. (available from www.ietf.org) |
| ICMP | RFC0792, Internet Control Message Protocol. J. Postel. September 1981. (available from www.ietf.org) |
| KERBEROS | RFC4120, The Kerberos Network Authentication Service (V5). C. Neuman, T. Yu, S. Hartman, K. Raeburn. July 2005. (available from www.ietf.org) |
| SPL | U.S. Pat. No. 6,779,120 A Declarative Language for Specifying a Security Policy Valente, et al, issued Aug. 17, 2004 |
| LDAP | RFC4511, Lightweight Directory Access Protocol (LDAP): The Protocol. J. Sermersheim, Ed.. June 2006. (available from www.ietf.org) |
| NAC | Network Admission Control., Cisco Systems, Inc., http://www.cisco.com/en/US/netsol/ns466/networking_solutionspackage.html |
| NAP | Network Access Protection, Microsoft ® Inc., http://www.Microsoft ®.com/technet/network/nap/default.mspx |
| NAT | RFC2663, IP Network Address Translator (NAT) Terminology and Considerations. P. Srisuresh, M. Holdrege. August 1999. (available from www.ietf.org) |
| PDSTUDIO | U.S. Pat. No. 7,246,370 PDStudio Design System and Method Valente, et al, Issued Jul. 17, 2007 (NOTE: references to PDSTUDIO should be taken as also referring to its continuation, PDSTUDIO1). |
| PDSTUDIO1 | U.S. Patent Application 11/777,766, PDStudio Design System and Method Valente, et al, filed Jul. 13, 2007 as CIP of USPN 7,246,370. |
| MONITOR | U.S. Patent Application 10/311,109 Network Monitor Internals Description Cooper et at, filed Jun. 14, 2001 |
| TCP | RFC0793, Transmission Control Protocol. J. Postel. September 1981. (available from www.ietf.org) |
| UDP | RFC0768, User Datagram Protocol. J. Postel. August 1980. (available from www.ietf.org) |

Discussion

FIG. 1 is a block schematic diagram of an identities correlation infrastructure for passive network monitoring according to the invention. In FIG. 1, an identity enabled policy monitoring system 101 includes an identity enabled network monitor 103. The network monitor 103 receives network traffic 102 from a network under observation 100, and it operates in connection with an identity enhanced policy 110 via communication with an Identity Acquisition Manager (IAM) 107, for example to report, via a user interface 104, on traffic based upon a correlation analysis of user identities and traffic. Studio 111 accesses the network directory 108 to determine user and group information, and is used by a human operator to create the identity enhanced policy 110.

The IAM is connected to the identity enabled network monitor 103, to servers within the network under observation 100, as well as to one or more Distributed Logon Collectors (DLC) 106. These connections may use the network under observation or a separate network. Prior art systems look at network traffic anonymously. The invention connects actively into the identity infrastructure of the network under observation, for example via the network directory 108, to get information regarding user and authenticated computer identities. While in the preferred embodiment, the network directory 108 and the network identities sources 105 are combined in a Microsoft® Active Directory Domain Controller (DC) [AD], any kind of directory system would work with the invention.

When a user logs in from a workstation 109, an entry appears in the security log of one of the network identities sources 105. One of the DLC 106 is allocated to examine this source, and it reads the entry and feeds it back to the IAM 107. The entry indicates the user's logon name and the Internet Protocol (IP) address or DNS name of the workstation 109. If a DNS name is used, it is converted to an IP address using industry standard DNS lookup tools. The IAM 107 then looks up that user's logon name in the network directory 108 and finds out such security information about that user as his unique name, which security groups he is part of, and the like. In some embodiments of the invention the user's logon name may be represented by a binary identity value, such as a Microsoft® Security Identifier string (SID), which must also be looked up in the network directory 108.

Over time, the IAM 107 thus builds a database of all the users and authenticated computers currently represented as logged in within network identities sources 105, the IP addresses at which they are logged in, the times they logged in, their real names, and the security groups of which they are member. The IAM 107 also uses special techniques to determine when users are logged off and so remove entries from this database. This will be described below. The IAM 107 uses a special network protocol to replicate its identity database on every network monitor, so as to allow the monitors to apply the identity enhanced policy 110 to the monitored traffic in real time.

It should be appreciated that said database of all users with their IP address locations in a distributed system is a useful information source not otherwise available from the network authentication system. This is the case because network authentication systems are designed only to be accessed during a particular authentication event, i.e. at one point in time, and are not continuously involved in the authentication of users on the network. In some embodiments, the IAM provides a report showing this information.

The identity enhanced policy 110 has multiple tiers based on user identities. There are tiers that are based on the user's identity, there are tiers that are based on authenticated computer identity, and there are tiers that are based on IP address. Key to the invention is merging identity into the policy. Significantly, not only are the multiple tiers themselves important, but the way the system gets information via the IAM, i.e. via identity acquisition management, is unique. In the art, it is known to manage identities for purposes of authentication. In such case, authentication is a point event. In contrast and uniquely amongst distributed systems, the invention carries the identity forward for the life of a user logon. On the strength of an authentication event, the invention then carries the identity which served as the basis for authentication forward, for example, during a session for purposes of policy enforcement.

It should be appreciated that the identity enhanced policy 110 may be specified without resort to the IP Address of a computer on the network under observation 100. This permits the policy to work even when IP Addresses are allocated dynamically, for example by using the Dynamic Host Configuration Protocol [DHCP]. Prior techniques for dealing with DHCP allocation involve mapping IP Addresses to DNS names [DDNS]. This invention bypasses the need for such lookup by mapping the IP address directly to the authenticated user.

Network Traffic 102 is passively monitored by the identity enabled network monitor 103. The monitor 103 performs protocol analysis and determines the flow of traffic on the network under observation 100. The identity enabled network monitor 103 receives incremental information from the IAM 107 about the evolving relationship between IP address and user or authenticated computer identity; and between the IP address and user or computer group identity. The identity enabled network monitor 103 correlates the user, authenticated computer, user group and computer group information with network traffic information to infer which users, authenticated computers and user or computer groups were responsible for generating the network traffic 102. The monitor 103 compares this identity enhanced view of traffic against the formal specification in an identity enhanced policy 110. The monitor 103 generates a human-readable report on the User Interface 104, indicating which traffic met and did not meet the policy 110.

Figure 7:
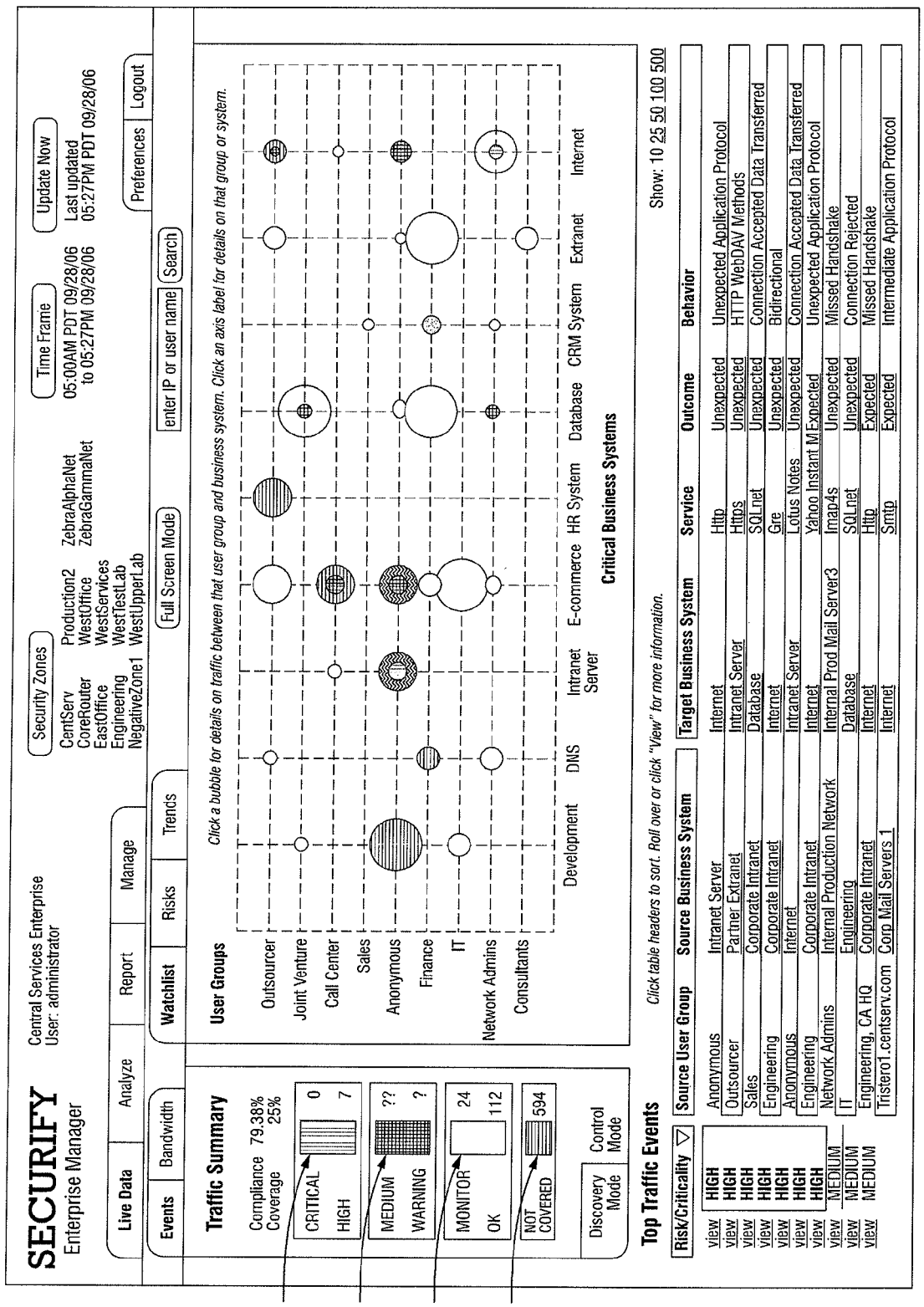
FIG. 7 is a bubble diagram display of user-group to critical business system according to the invention.

An exemplary report, such as appears on User Interface 104, is shown in FIG. 7. It uses a bubble icon to show the magnitude of data caused by different user groups when accessing different groups of servers within network under observation 100. It should be appreciated that the policy result of the identity enabled policy monitoring system 101 may be encoded into the color of the bubbles, e.g. green for OK traffic, red for critical violations, etc.

Determination of Logout

The network identities sources 105 contain information about authentication events. These occur when a workstation attaches to the network under observation or when a new user logs in. However, user logout or removal of the workstation from the network is not indicated in this information. For example, a user may unplug a workstation and go home for the night. Most network identities sources 105 contain no information about this event. This presents several problems: the IAM database may contain information about logons that are no longer current; the network might reassign this IP address, for example, using DHCP, so that the IAM database may contain information about the wrong computer; and the IAM database may fail to distinguish between one user logging out followed by another logging in versus two users concurrently using a computer. To avoid these problems, the IAM 107 implements a strategy to determine when a user is logged off the network.

The identity acquisition manager 107 instructs the DLC 106 to probe remote workstation 109 to determine if the identities are still valid. In the preferred embodiment, there are two probes used. The simplest probe determines whether workstation 109 is still attached to the network. If so, an identity aware probe is used. The identity aware probe indicates which users are currently logged into workstation 109. This information is used to amend the IAM logon database. The IAM 107 is able to process information more efficiently when the identity aware probe works, but does not require it to work for all workstations on the network. In one embodiment, the identity aware probe is a Microsoft® Remote Procedure Call that reads the Microsoft® Windows Registry of the workstation 109, using credentials stored in a file co-resident with the IAM 107. Other probing techniques are also possible.

The IAM 107 must take care to assign semantics to the results of a probe correctly, because probes may fail due to firewall software running on the remote workstation 109 or other network problems. If IAM 107 never succeeds in probing the workstation 109, the IAM 107 must assume that probing to workstation 109 is not possible. In this case, a timeout is used to age the logon information in the IAM database. The timeout is chosen so that the workstation 109 is likely to re-authenticate to the network authentication system before the timeout is reached. In one embodiment, this is accomplished by basing the timeout on the typical Kerberos [KERBEROS] Ticket lifetime in the Microsoft® Network [AD]. If the workstation probes successfully, then fails to probe, the IAM may conclude that the workstation has been removed from the network. To compensate for transient network problems, the IAM 107 also can require a number of sequential failures before assuming that the workstation has been removed.

In the preferred embodiment, the IAM 107 requires that IP-addresses be unique across all the Microsoft® Domain Controllers (DCs) from which logons are derived, i.e. it cannot process data from DCs where two distinct workstations have the same IP address. This might occur due to use of Network Address Translation [NAT] within the network under observation 100. If this situation exists within the deployment environment then separate IAMs must be configured to cover different parts of the network.

Figure 2:
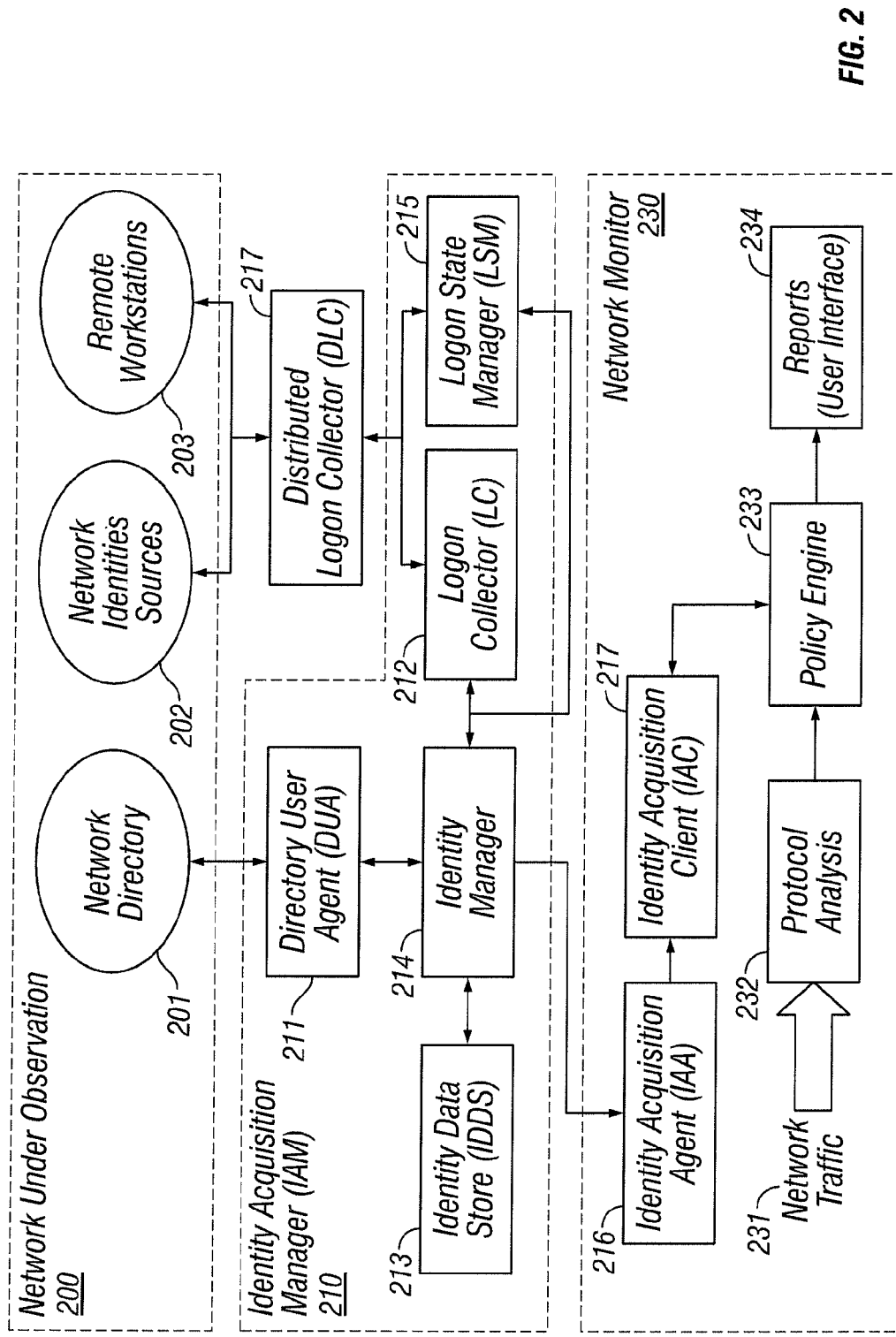
FIG. 2 is a block schematic diagram showing an identity acquisition manager according to the invention.

FIG. 2 is a block schematic diagram showing an identity acquisition manager 210 according to the invention. More detail is shown than in FIG. 1. Corresponding reference numerals from FIG. 1 are also shown in parentheses with their FIG. 2 counterparts in the discussion below. The IAM 210 performs a centralized identity gathering function. FIG. 2 also shows a network under observation 200 (100), including an network directory 201 (108), network identities sources 202 (105), and remote workstations 203 (analogous to workstation 109); and a network monitor 230 (103), and a reports user interface 234 (104).

The IAM 210 itself comprises a series of modules. The Identity Manager module 214 operates in connection with an Identity Data Store (IDDS) module 213, Identity Acquisition Agent (IAA) module 216, and Identity Acquisition Client (IAC) module 217. The Identity Manager module starts one or more Logon Collector (LC) modules 212 running. The LC 212 each use a distributed logon collector module 217 (DLC) to collect the logon information from the network identities sources 202.

The identity acquisition manager 210 provides a centralized service for multiple network monitors 230. A separate IAM 210 for a portion of the network is possible. The Identity Acquisition Agent 216 and Identity Acquisition Client 217 are co-resident on the network monitor 230. One or more Distributed Logon Collectors 217 may be distributed within the network under observation 200 to provide access to remote identity sources 202 and workstations 203 without resort to expensive WAN connections.

The components of the identity acquisition manager 210 are:

The Identity Manager 214, which coordinates identity acquisition and distribution activities.

The Directory User Agent (DUA) 211, which queries network directory 201 at the behest of the Identity Manager 214, to determine user and authenticated computer to group mappings and binary to textual user name mappings.

The Identity Data Store (IDDS) 213, which is used by the Identity Manager to store IP address to user, authenticated computer and group mappings. The Identity Data Store provides persistent storage of Identity information.

The Logon Collector 212 (LC) which uses the Distributed Logon Collector 217 to query remote identity sources 202 about logon information in the network under observation 200. The DLC 217 gathers logon information by reading the Event log from a network identities source 202, such as a Microsoft® Domain Controller. On restart, the Logon Collector 212 may direct the DLC 217 to continue processing the Event Log from the point where it left off. In other embodiments, various Logon Collectors use alternate mechanisms to gather logon information. Amongst these alternate mechanisms are Windows Registry [AD] reading, Continued monitored activity from an IP address, Monitored DHCP [DHCP], and Kerberos [KERBEROS] traffic.

The Logon State Manager 215 (LSM), determines if logons are still in effect, i.e., it decides on logouts. It uses the Distributed Logon Collector 217 to probe remote workstations 203 to determine if they are still connected to the network 200 and to list active user logons. The Logon State Manager collects logon information from the Identity Manager 214. The Logon State Manager 215 decides when logouts have occurred. Logouts are determined in this embodiment of the invention by:

A timeout. In some embodiments, the timeout may be chosen to match the timeouts in the network authentication mechanism, such as the Kerberos ticket lifetime. An exemplary timeout value is six hours.

Identity aware probing, such as using remote access to the Windows Registry. Identity aware probing may not be possible to some machines on the network because of operating system incompatibilities or limitations, or lack of credentials.

Network probing. Network probing uses network transport protocols to determine whether a probe target is present on the network. Network probing is possible across all operating systems and does not require authentication. It may still fail due to network or personal firewall configurations. In the preferred embodiment, network probing consists of sending an ICMP [ICMP] echo (aka "ping") packet to the probing target concurrently with TCP [TCP] SYN packets on common ports, such as 22, 80, 139, and 445.

In the preferred embodiment of the invention, the LSM sets a timeout when a new logon is received. Network probes are used periodically, such as every 5 minutes. Once network probes have returned successfully, identity aware probing is also attempted. If successful, subsequent probing is all identity aware. Otherwise network probing continues.

The Identity Acquisition Agent 216, which receives periodic updates, containing mappings from IP to user or authenticated computer and from IP to group, from the IAM 214.

The Identity Acquisition Client 217, which provides the Policy Engine 233 with identity information for given IP addresses on demand.

In the system shown in FIG. 2, control proceeds as follows:
1. The IAM 214 establishes the connection between the LC 212 and DLC 217 and LSM 215 and DLC 217. Multiple LC 212 and DLCs 217 may appear in the system.
2. The LC 212 instructs the DLC 217 to return logon information. The DLC 217 accesses the Remote Identity Source 202, and returns logon information as conditions in the network change over time.
3. Identity information from the Remote Identity Source 202 proceeds through the DLC 217 to the LC 212 to the Identity Acquisition Manager 214.
4. The IAM 214 then requests of the Directory User Agent 211 that binary identity values, if any, be converted in the logon information, and it queries further to determine group membership of the logon information. The Directory User Agent 211 may use the IDDS 213 as a cache, to avoid unnecessary lookups. This is an optimization of the concept and is not shown in FIG. 2. In the preferred embodiment, binary identity values are Microsoft® Security Identifiers (SID's).
5. The IAM 214 stores the logon information into the IDDS 213.
6. The IAM 214 gives logon information to the LSM 215. The LSM 215 uses the DLC 217 to probe user workstations to determine if the logon information is still valid or if a workstation has been removed from the network 200.
7. The IAM 214 passes changes in logon information to the IAA 216. This is co-resident on the network monitor 230.
8. The Identity Acquisition Agent 216 uses the incremental updates from the IAM 214 to build up a local copy of the current logon state.
9. The Identity Acquisition Agent 216 receives queries from the Identity Acquisition Client 217 as identity information is needed by the Policy Engine 233. The IAC 217 caches a subset of this information for speed.
10. Each new network connection at Policy Engine 233 causes the IAC 217 to be queried. The logon information returned is included in the connection data, which is then used by the Policy Engine 233 to determine policy compliance.

Note: In another embodiment, the LC and LSM connect directly to the remote machines in the network under observation, and no DLC is present.

Policy Development Using Identities

The policy is a formal description of network entities and their mutual interactions (behavior). In this invention, a policy is defined as a set of relationships, as described in [PDSTUDIO] and [PDSTUDIO1]. Each relationship is a 4-tuple <Initiator, Target, Service, Outcome>

With:

Initiator is any network object

Target is a network object that represents addressable network objects or authenticated computers.

Service is a description of a protocol on the network, such as a transport protocol running on one or more ports or an application protocol which has been recognized through deep packet inspection.

Outcome is a policy result, consisting of a user-defined name and a severity, e.g. HIGH, MEDIUM, WARNING, OK. In the preferred embodiment, Outcomes contain a vector of severities, each with an attached protocol behavior, e.g. HTTP GET versus PUT.

Each 4-tuple relationship defines the policy when the initiator network object connects to the target network object using protocols described within Service, causing the policy result to be the specified Outcome.

Identity Objects

This section describes the identity objects that are used in the Studio to represent network identities.

Studio Policy Identity Objects

Studio provides a number of policy objects that represent network identities to which policy can be ascribed. Table 4 lists these objects.

All Studio identity objects have a globally-unique identifier, hereinafter referred to as the object's unique name.

The following is a description of each object type:

User—a User object represents a single human user or computer process. In the preferred embodiment, it represents a user object in the Active Directory. Users can be active principals, i.e. initiators, in a policy relationship and cannot be passive principals (targets).

Computer—a Computer object represents a set of one or more authenticated computers. In the preferred embodiment, it represents a computer object in the Active Directory (computer objects are a kind of user object). Computers can be both passive, i.e. target, and active, i.e. initiator, principals in a policy relationship.

Group—a Group object represents a collection of users, computers or both. There are four types of Group objects:

User Group—a group that is defined in and maintained by the network directory 201. In the preferred embodiment this identity object represents an Active Directory Group. User Groups can be active principals, i.e. initiators, in a policy relationship and cannot be passive principals (targets).

Computer Group—a collection of Studio Computer objects. Computer Groups can be both passive (target) and active (initiator) principals in a policy relationship.

Custom Group—a collection of Studio User and Computer objects. Custom Groups can be active principals, i.e. initiators, in a policy relationship and cannot be passive principals (targets).

Built-in Group—a generic and unbound collection of real-world objects denoted by their authentication attributes. Studio defines three types of Built-in Groups:

Authenticated Users, which denotes all users that have been authenticated by the network directory.

Authenticated Computers, which denotes all computers that have been authenticated by the network directory.

Anonymous, which denotes all systems that are neither members of the Authenticate Users group nor of the Authenticated Computers group.

TABLE 4

Studio Identity Objects

| | | |
|---|---|---|
| User | | |
| Computer | | |
| Group | User Group | |
| | Computer Group | |
| | Custom Group | |
| | Built-in Group | Authenticated Users |
| | | Authenticated Computers |
| | | Anonymous |

Host Binding

Studio permits the user to define an identity address space. This is a description of which IP addresses are potentially covered by identities in the network under observation 200. For example, it is most likely that network identities exist within a corporate network (the "Intranet") as opposed to outside of it (the "Internet"). This information is communicated to the IAC 217. It is significant to the invention that the IAC 217 quickly determine which addresses are liable to have an identity and which are not.

Identity policy objects can be bound to zero, one or more addressable network objects. An addressable network object, or host, comprises, directly or indirectly, an IP address space. If an Identity policy object does not specify a host binding, it is implicitly bound to the entire identity address space.

Host binding provides a powerful capability for defining corporate network security policies by allowing policy developers to differentiate between a network identity monitored in one part of the network versus the same identity monitored in a different part of the network. For example, a user accessing the network from within the corporate headquarters network may be afforded different privileges than the same user accessing the network from a satellite office.

Multi-user Computers in Studio

An IP address may be associated with zero, one or more directory users. An IP address with more than one concurrent directory user constitutes a multi-user computer. Multi-user computers are considered to have no individually identifiable users logged on and, thus, no user groups beyond those of which the computers themselves are members and the Authenticated Users built-in group.

A Studio Computer object may be flagged as being a multi-user computer. This informs the IAC 217 that the specified machine is always considered as a multi-user computer regardless of the number of users that are logged on concurrently. This ensures that policy applied to multi-user computers is applied consistently and deterministically regardless of the number of users logged on at that computer at any one point in time.

Ranking of Identity Policy Objects

Studio's Identity Policy Objects are ranked with respect to each other, as well as with respect to addressable network objects. Ranking is a priority mechanism, similar to that described in [SPL]. Ranking of network objects is critical to determining the relative priority of policy relationships and, thus, a network object's effective policy. The following denotes the ranking of the Identity Policy Objects in decreasing rank order:

1. A User object or a Computer object.
2. A Group object representing a User Group, a Computer Group or a Custom Group.
3. The built-in Authenticated Users Group.
4. The built-in Authenticated Computers Group.
5. The built-in Anonymous Group.

Identity Policy Objects rank higher than any addressable network object (subnets, hosts, etc.). Thus, identity policy always overrides host-based policy (with the exception of prescriptive policy, described below).

Host binding affects the ranking of an Identity Policy Object. If, in the absence of host binding, two identity objects are ranked at the same level, the identity object bound to the highest ranking addressable network object outranks the other. For example, if the same user is bound in one Studio User object to the Intranet and, in another User object, to a subnet that is part of the Intranet, the latter ranks higher than the former.

Identity Policy Objects and Inheritance

Identity Policy Objects are arranged in a containment hierarchy that is used to determine how policy defined for an object that is a policy relationship target is inherited by other objects that it contains. The containment hierarchy matches the ranking hierarchy, defined above. Table 5 defines the containment hierarchy for computer objects.

TABLE 5

Computer Object Containment Hierarchy

| Identity policy object | Contains |
| --- | --- |
| Authenticated Computers | Computer Group Computer |
| Computer Group | Computer |

To wit:

Policy defined at the Authenticated Computers level applies to, i.e. it is inherited by, all Computer Group objects and to all Computer objects that are not in a Computer Group.

Policy defined at a Computer Group level applies to all its members.

Identity Policy Objects and Effective Policy

A network object's effective policy is defined as the aggregate policy in effect for that network object, taking into account all the policy inherited from its parent network object and any additional policy defined by the network object itself, including policy that may override inherited policy. The algorithm for computing effective policy relationships for any given network object is as follows:

1. Determine the relative ranking of the relationships' services; ranking is based on the services' transport layer specifications, namely, the ports and protocol used by the service. If one service uses the TCP transport protocol and the other the UDP transport protocol they are distinct and, thus, complementary. If they use the same protocol but non-overlapping port numbers they are likewise distinct and complementary. However, if their port numbers overlap, and one is a proper subset of the other, the service with the smallest set of ports ranks higher than the service with the largest. If the sets are identical, the services are also identical. If the sets intersect but one is not a subset of the other, the ranking is undefined.

2. For relationships that have identically ranked services, determine the ranking of the relationships' targets;

3. For relationships that have identically ranked targets, determine the ranking of the relationships' initiators;

The relationship with the highest ranking, as determined by the algorithm above, overrides the relationship with the lowest ranking. The override may be partial, if only one portion of the relationship is overridden, or complete, if the entire relationship is overridden.

Relationship overrides are illustrated in the following example:

Consider the following relationships, presented in decreasing ranking order:

1. Host-A offers Ssh to User-X
2. Host-A offers Ssh to Host-B
3. Host-A offers Tcp to User-X whereas Host-A and Host-B are addressable network objects, User-X is a User object, Ssh is TCP based service that uses port 22 and Tcp is a TCP based service that uses any port in the range 1-65535.

Relationship #1 ranks higher than relationship #3 because the Ssh service ranks higher than the Tcp service because port 22 is a subset of ports 1-65535. Relation #1 ranks higher than relationship #2 because an identity network object ranks higher than an addressable network object. Relationship #2 ranks higher than relationship #3 because Ssh ranks higher than Tcp and that takes precedence over the relative ranking of the relationships' initiators.

Table 6 below shows the ranking of relationships with all possible combinations of policy objects and services. In Table 6, Host-A and Host-B are addressable network objects, as are Subnet-A and Subnet-B, with the letters A and B implying containment, e.g. Subnet-A contains Host-A which, as described in [PDSTUDIO] results in Host-A ranking higher than Subnet-A. User and Machine represent User and Computer objects respectively while Group represents a directory Group or custom group, and Servers represents a computer group that contains Machine. By convention within the invention, the rank is expressed as an ordinal with lowest rank equal to one (1).

TABLE 6

Ranking of Relationships with all Possible Combinations of Policy Objects and Services

| Rank Ordinal | Target | Service | Initiator |
| --- | --- | --- | --- |
| 20 | Machine | Ssh | User/Machine |
| 19 | Servers | Ssh | User/Machine |
| 18 | Machine | Ssh | Group/Servers |
| 17 | Servers | Ssh | Group/Servers |
| 16 | Machine | Ssh | Host-A |
| 15 | Servers | Ssh | Host-A |
| 14 | Machine | Ssh | Subnet-A |
| 13 | Servers | Ssh | Subnet-A |
| 12 | Machine | Tcp | User/Machine |
| 11 | Servers | Tcp | User/Machine |
| 10 | Host-B | Ssh | User/Machine |
| 9 | Subnet-B | Ssh | User/Machine |
| 8 | Host-B | Ssh | Group/Servers |
| 7 | Subnet-B | Ssh | Group/Servers |
| 6 | Host-B | Ssh | Host-A |
| 5 | Subnet-B | Ssh | Host-A |

TABLE 6-continued

Ranking of Relationships with all Possible Combinations of Policy Objects and Services

| Rank Ordinal | Target | Service | Initiator |
|---|---|---|---|
| 4 | Host-B | Ssh | Subnet-A |
| 3 | Subnet-B | Ssh | Subnet-A |
| 2 | Host-B | Tcp | User/Machine |
| 1 | Subnet-B | Tcp | User/Machine |

Identity Objects and Prescriptive Policy

Prescriptive relationships are a type of relationship that cannot be overridden by a non-prescriptive relationship. They allow a policy developer to express a general policy statement across an entire segment of the network without fear of it being overridden by higher ranking relationships within it. For example, the policy statement "thou shalt not use the Telnet service to access any system on the Intranet," expressed as a prescriptive relationship "Intranet offers Telnet to All Networks with an outcome of High-Risk-Service," cannot be overridden by the higher ranking relationship "Router-X offers Telnet to IT-Workstation with outcome Router-Management", unless the latter relationship is also prescriptive.

In the preferred embodiment, a service relationship can be made prescriptive if, and only if, the relationship's target is an addressable network object. Relationships where the target is an Identity Policy object (Computer, Computer Group or Authenticated Computers) cannot be made prescriptive and are not overridden by any of the prescriptive relationships.

Prescriptive relationships where the initiator is a host network object override relationships where the initiator is an identity object and vice-versa Policy Engine Identity Attributes Studio Identity objects have an underlying representation in the policy language used by the Monitor's Policy Engine [SPL]. Table 7 lists the attributes used to represent User, Computer and Group objects and their respective rank numbers, from which credential and rule rankings are derived as described in [SPL].

TABLE 7

Policy Engine Identity Attributes and their Rankings

| Attribute Name | Description | Rank |
|---|---|---|
| users | a set of unique names denoting the users and computer currently associated with the IP address in the network under observation 200. It includes zero or one users and zero or one authenticated computers logged into the machine represented by the IP address. If there is more than one user logged in, i.e. it is currently a multi-user computer, only the logged in computer name, if any, is listed. | 5 |
| groups | a set of unique names denoting all the directory groups, custom user groups and computer groups of which the user and authenticated computer listed in the 'users' attribute are members. This set includes the transitive closure of all groups, i.e. if a listed group is a member of another group, the latter is also included. | 4 |
| isUserAuthenticated | True if the IP address represents an authenticated user, false otherwise. | 3 |
| isMachine-Authenticated | True if the IP address represents an authenticated computer, false otherwise. | 2 |
| isAnonymous | True if both 'isUserAuthenticated' and 'isMachineAuthenticated' are false. | 1 |

Delayed Evaluation of Protocol Events

[SPL] describes how the Policy Engine 233 processes protocol events in the order they are received. Processing a protocol event involves evaluating it against the current policy and determining its disposition. With the introduction of the user identities capability, it became imperative to delay the evaluation of all protocol events in a network event until such time as the user identities associated with the source and destination IP addresses can be ascertained, that is, until these IP addresses can be mapped to Studio identity objects. This mapping is performed by the IAC 217 at the behest of the Policy Engine 233. When the IAC 217 receives a request to map IP addresses to Studio identity objects, it satisfies the request in one of the following three ways:

1. The IAC 217 already has an up-to-date mapping in its internal cache. It immediately returns the result to the Policy Engine 233;
2. The IAM 210 is not currently available and, thus, the mapping cannot be performed. The IAC 217 returns an indication that the mapping of IP addresses to Studio identity objects cannot be performed;
3. There is no up-to-date mapping available and the IAC 217 has to wait for one or more update cycles from the IM 216 before returning the mapping information to the Policy Engine 233. The waiting period is bound by a reasonable time limit, e.g. 5 seconds.

The third scenario may occur when a new authenticated computer connects to the network because there is a delay in the propagation of its logon state from the network identity sources 202 to the IAM 210 as well as from the IAM 210 to the IAA 216. During this period, the Policy Engine 233 may detect transactions for the new computer and request its identity information from the IAC 217. The IAC 217 must wait until the IM 216 has the appropriate information before returning a response to the Policy Engine 233. This causes delayed processing of the protocol event that originated the IP address mapping request currently in process. However, the Policy Engine 233 continues processing other protocol events while waiting for the IAC 217 to complete the processing of the mapping request. All protocols events belonging to the pending network event are held back and queued until the IAC 217 returns the mapping results, at which point all such protocol events are evaluated in the order in which they were received.

Figure 3:
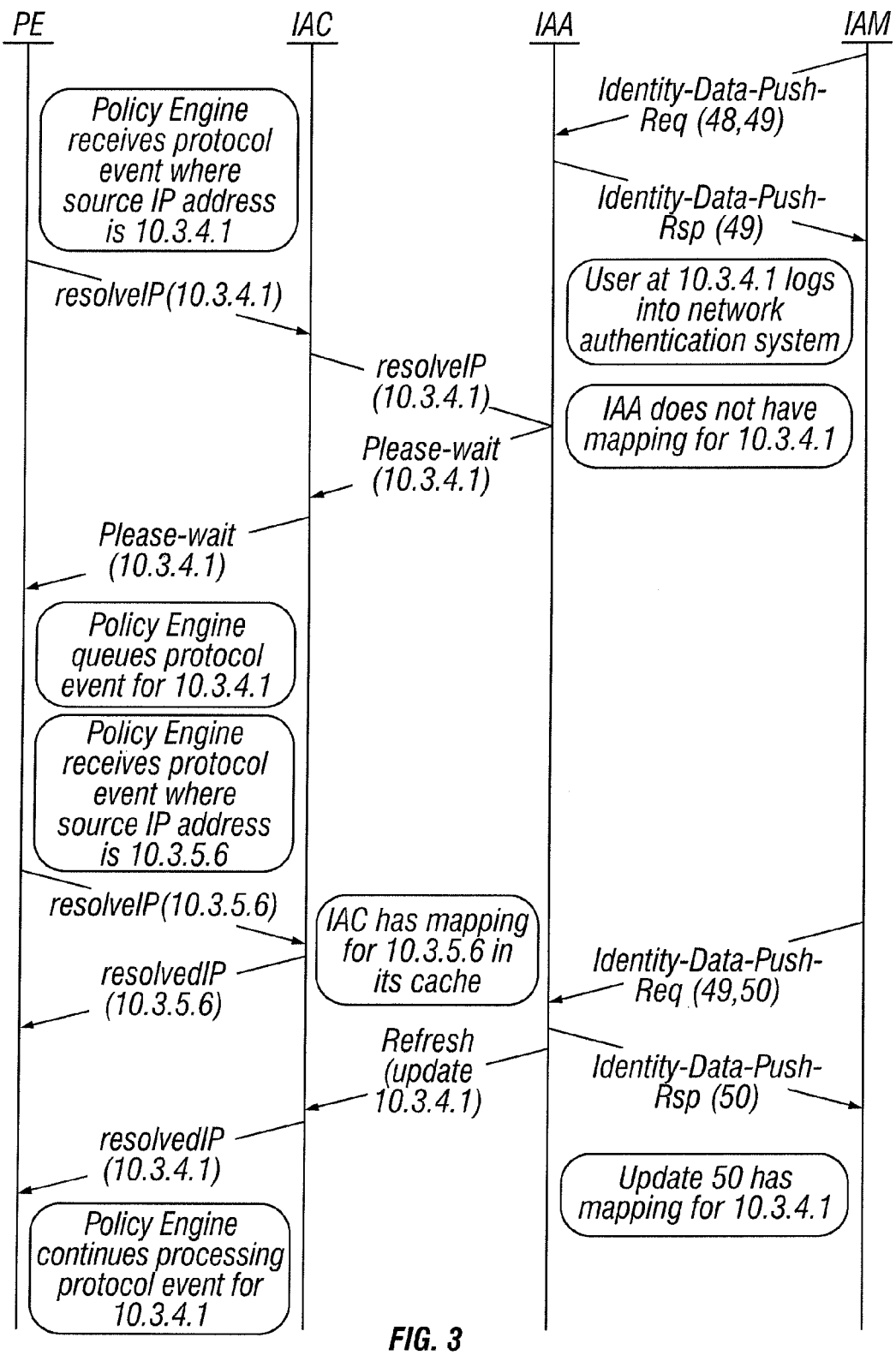
FIG. 3 is a sequence diagram that illustrates delayed processing of protocol events for new IP addresses according to the invention.

FIG. 3 depicts how the processing of a protocol event is held up until one or more of its IP addresses can be mapped to Studio identity objects.

Implementation Details of Preferred Embodiment

Logon State Objects

The following data represents the identity of a user within the IAM 210:

User's Unique Identifier; this identifier is identical to the user's SID within the Active Directory [AD].

User's Name; and

List of Groups of which the user is a member, by transitive closure, i.e. if a group is a member of another group, the latter is also included.

The following data represents the identity of an authenticated computer within the IAM 210:

Computer's Unique Identifier; this identifier is identical to the computer's SID within the Active Directory [AD]

Computer's Name; and

List of Groups of which the computer is a member, by transitive closure.

Figure 4A:
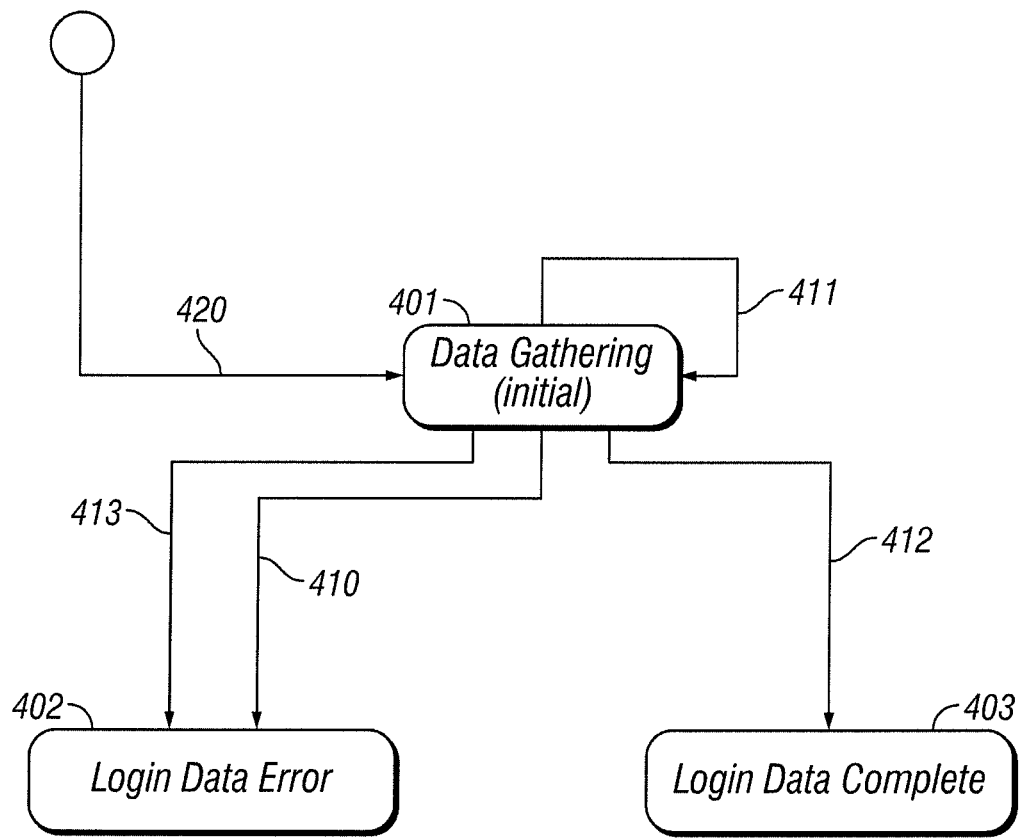
FIGS. 4a and 4b are state transition diagrams which show state machines for a logon event (FIG. 4a) and a logon state object (FIG. 4b) according to the invention.

The following data represents a Group:
Group's Unique Identifier; this identifier is identical to the group's SID within the LDAP [LDAP] directory; and
Group's Name FIG. 4a is a state machine for the objects representing a logon event within the IAM (210).

A Logon Event represents the state of a logon that has been detected from a network identities source 202. Typically, a Logon Event moves from the Data Gathering to Logon Data Complete state as User Identity Information is gathered from the network directory 201. The following states are defined for the Logon Event object:

Data Gathering (initial) 401: A logon 420 has been detected; User Identity Information is being gathered to complete the data for this event. There may be multiple (asynchronous) network directory 201 requests outstanding within this state. Valid events within this state are:

DUA Timeout 410—The directory is inaccessible, causing transition to Logon Data Error state 402.
Intermediate DUA Responses 411—The directory lookup is in progress, additional items are being looked up.
Final DUA Response 412—the directory lookup has completed successfully, causing a transition to Logon Data Complete state 403.
DUA Error 413—the requested information is not present in the directory, causing transition to Logon Data Error state 402.

Logon Data Error 402: A logon cannot be mapped properly. The logon event is deleted.

Logon Data Complete 403: A logon has been detected and the gathering of the relevant User Identity Information is complete. A logon state object is looked up and created if necessary to represent this information in the IAM. The logon event then acts as input to the state diagram in FIG. 4b.

Figure 4B:
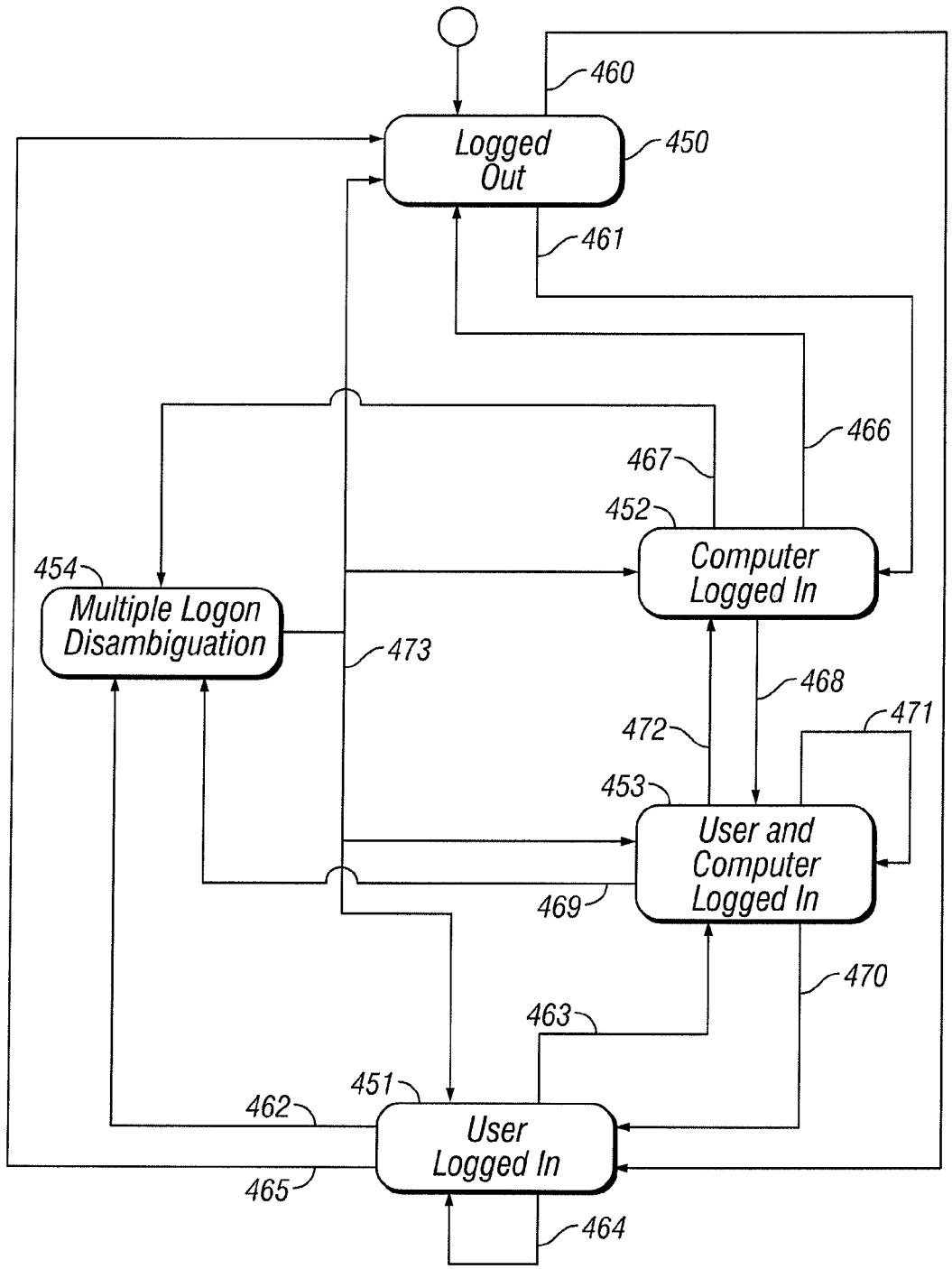

FIG. 4b is a state machine representing the further processing of a logon event object within the IAM (210) after it has proceeded to Logon Data Complete state 403, as shown in FIG. 4a.

The logon state object is created, above, in the Logon Data Complete state 403. This object represents the mapping from an IP address to 0, 1 or more users or computers, represented by their User Identity Information. Typically a logon state object will move between the Logged Off state and the various Logged On states. The logon state object moves back to the Logged Off state if there are no more users or authenticated computers associated with the IP address. The following states are defined for the logon state object:

Logged Out 450: There are currently no users or authenticated computers associated with the given IP address. This is the initial state of a logon state object. Valid events within this state are:
User Logon 460—a new user logon event has been detected for this IP address
Computer Logon 461—an authenticated computer logon event has been detected for this IP address User Logged In 451: There are one or more logged on users associated with this IP address, but no authenticated computer logons. Valid events within this state are:
User Logon 462—a user logon event has been detected for this IP address
Computer Logon 463—an authenticated computer logon event has been detected for this IP address
User Logoff 464—one of the multiple users associated with this IP address has logged out
Final User Logoff 465—the final user associated with this IP address has logged out Computer Logged In 452: There is an authenticated computer associated with this IP address, but no users. Valid events within this state are:
Computer Logoff 466—the authenticated computer associated with this IP address has logged out
Computer Logon 467—an authenticated computer logon has been detected for this IP address
User Logon 468—a user logon has been detected for this IP address User And Computer Logged In 453: There are one or more users and an authenticated computer associated with this IP address. Valid events within this state are:
Logon 469—a user or authenticated computer logon has been detected for this IP address
Computer Logoff 470—the authenticated computer associated with this IP address has logged out
User Logoff 471—one of the multiple users associated with this IP has logged out
Final User Logoff 472—the final user has logged off Multiple Logon Disambiguation 454: Multiple user or computer logons have been detected. The LSM 215 is interrogated to determine what the new state of the logon state object should be. The algorithm used by the LSM 215 to determine the new state is described below. Valid events within this state are:
Disambiguation Response 473—The LSM 215 has determined what the new state of the logon state object should be. The new state is one of Logged Out 450, Computer Logged In 452, User and Computer Logged In 453 or User Logged In 451.

This state is covered in detail, below.

Multiple User Logons

When a new logon is reported, it is possible that a previous logon exists at the same IP address for a different user. When this occurs, the logon state object enters the Multiple Logon Disambiguation state 454. There are several reasons why this can happen:
There may be multiple users logged into this workstation 203;
The user who was logged in may have logged out and a new user logged in because logouts are not recorded in the network identities sources 202, the logon state shows both old and new logons; and
The workstation 203 may have been disconnected and a different workstation is later connected with the same IP address, e.g. because of DHCP reuse of IP addresses.

As described above, the LSM 215 attempts to perform identity aware probing on the workstation 203. In the preferred embodiment, this is a Microsoft® Windows remote Registry request to list the key HKEY_USERS, which returns a list of all the users logged on to the workstation, according to their Microsoft® SIDs. If such identity aware probing has been successful, the LSM 215 can use it to determine which of the above conditions is true. If both users are logged on, the LSM 215 declares two simultaneous logons on the host, if only one user, the LSM 215 updates the logon state object to indicate which user logon is valid. When identity aware probing has not been possible to this workstation 203, the LSM 215 declares that any new logon implies a logout of all previous ones.

Multiple Computer Logons

In the preferred embodiment, authenticated computer logons are detected as a special kind of user logon. This corresponds to the concept of a computer logon in the Microsoft® Active Directory. Other directories and network authentication systems are also possible.

A logon state object has zero or one authenticated computers associated with it. Upon the detection of a change in the authenticated computer associated with a logon state object, all users currently associated with that logon state object are assumed to be logged off and are deleted from the state. The case of an IP address having multiple authenticated computers associated with it is not supported in the preferred embodiment because it would lead to an ambiguous result with respect to an authenticated computer used as a target of network traffic in policy.

Identity Replication

A function of the IAM 210 is to propagate changes in the local logon state objects (IP address to logon mappings) to each of the IAAs 216. This function could be performed by transmitting the entire set of logon state objects periodically. The preferred embodiment optimizes this interaction by typically sending only a series of changes to the logon state. This is analogous to a delta encoding. A generational numbering scheme is used to resynchronize the delta encoding in the presence of network transmission failures.

Each generational interval is chosen to ensure a high probability that identities have propagated from the network identities sources to the IAM 210. In the preferred embodiment, the generation interval is chosen as seven seconds. In each interval, the IAM 210 marks the updated logon state objects with the current generation identifier, a monotonically increasing integer value. The IAM 210 then sends the changes that took place within the current generation and the current generation identifier to each of its known IAAs 216. The recipient IAA 216 compares its current generation with the generation identifier contained within the update and accepts the update if it is the expected generation, being one greater than the last received. Otherwise the update is rejected, and the IAM 210 is notified that the IAA 216 is out of sync.

When so notified, the IAM 210 may recover by sending each of the appropriate older updates that have been previously distributed and stored within the IAM 210. If such updates are no longer available, the IAM 210 may resynchronize with a particular IAA 216 by sending all logon state objects.

Figure 5:
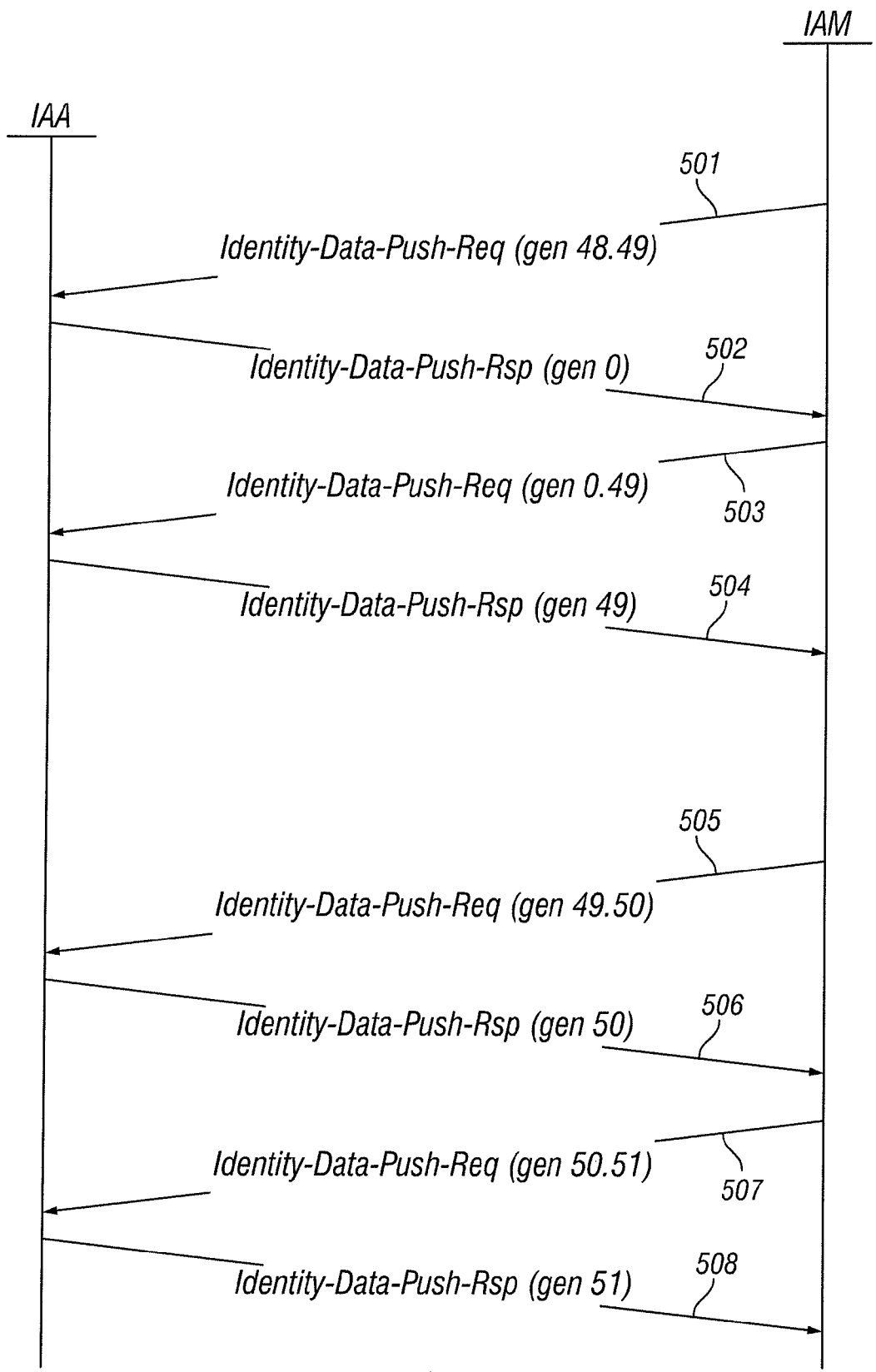
FIG. 5 is a flow diagram that summarizes the generation negotiation interactions between the IAM and IAA using the Identity Push Command according to the invention.

FIG. 5 provides an example of typical interactions between the IAM and IM.

In interaction 501 the IAM sends an update containing the changes to the logon state objects that occurred during generation 49. The IAA rejects this update (502) because it does not currently have generation 48.

In interaction 503 the IAM sends a complete replication of the logon state objects up to and including generation 49. The IM accepts this data (504).

In interaction 505 the IAM sends the next generation, generation 50, to the IAA. The IAA accepts the update (506) because it currently has generation 49. Similarly in 507, 508 the IAA accepts the generation 51 update.

Identity Acquisition Agent (IAA)

The IM 216 serves identity information to the IAC 217 by storing data received from an IAM 210. Its functions are:
Receives generational updates of logon state objects from the IAM 210 and maintains a local replication of the complete IAM logon state.
Provides a query interface to the IAC 217 to map an IP address to the current User Identity Information for said address, as represented in the replicated logon state.

In the preferred embodiment, the IAA 216 is co-resident with the policy engine 233 on the network monitor platform 230.

Identity Acquisition Client (IAC)

The IAC 217 provides a query interface to Policy Engine 233 to map an IP address to user identity information by querying its associated IAA 216. Its functions are:
Maintains a description of the identity address space from the current identity enhanced policy 110. This allows the IAC 217 to determine quickly which IP address cannot be mapped to an identity within the network authentication system; and
Maintains an in-memory cache of Identity information that has been requested from the IAA 216; and
Maintains a cache of IP addresses with no current associated user; and
Computes custom group membership from the identity enhanced policy 110 currently being processed by the Policy Engine 233.

The IAC 217 uses its cached information to speed the return of information to the Policy Engine 233 and avoid unnecessary requests to the IAA 216.

When a new IP address is detected by the IAC 217, i.e. an IP address that does not appear in any of its caches, it forwards a request to the IAA 216 to determine the identities associated with this IP address. However, the IAC 217 cannot be sure that the IAA 216 has this information, both because the information on this IP address might take some time to propagate through the IAM, and because the computer with this IP address might never authenticate to the network authentication system. For example, it might be an autonomous device, such as a router. The IAC uses a suitable timeout scheme to determine that the IP address in question has no identity. Upon this determination, the IAC 217 can add this IP address to the appropriate cache, and return this result to the policy engine 233.

In the current embodiment, the generational protocol from the IAM 210 to IAA 216 can be used to help the IAC 217 to determine if an identity mapping is possible to an IP address. After two IAM 210 generation updates, i.e. after the IAC 217 has guaranteed to have waited a full generation interval, the IAC 217 may safely assume that any new update concerning this IP address has had time to propagate to the IAA 216.

The IAC 217 is co-resident with the policy engine 233 in a single process on the network monitor 230 and communicates with the IAA 216, for example, via a Unix Domain Socket. There are two data flows between these processes:
Query Interface where the IAC 217 requests the User Identity Information for a given IP address; and
Refresh Interface, where the IM 216 sends a list of IP addresses along with their new or updated identity data to the IAC 217. The IM 216 provides updates for those IP addresses for which the IAC 217 has previously requested identity data.

Figure 6:
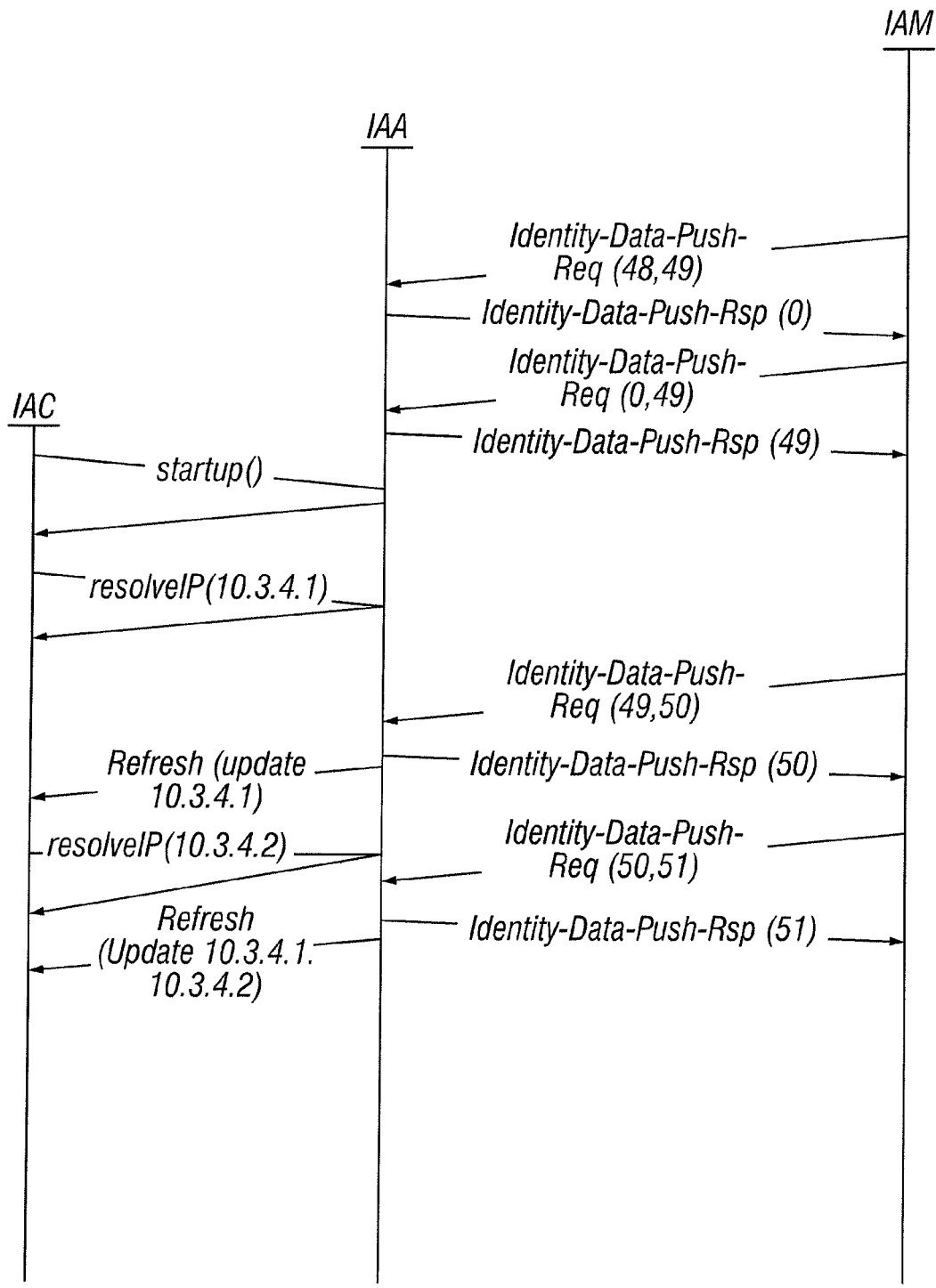
FIG. 6 is a sequence diagram that illustrates the IAC to IAA interactions in the context of the IAAs interactions with the IAM according to the invention.

FIG. 6 is a flow diagram that illustrates the IAC 217 to IM 216 interactions in the context of the IAA's interactions with the IAM 210.

Offline Processing of Identities

In the preferred embodiment, it is possible to save network event information offline in a file, known as a DME file [MONITOR]. It is also possible to capture a sequence of packets from traffic data in a file. This and prior inventions [MONITOR] permit evaluating policy on this offline file data. Since this invention adds the concept of an identity enhanced policy, it is desirous that offline processing also reflect identities. It should be appreciated that the name DME is chosen arbitrarily to refer to the file format, and is not an acronym.

The invention permits identity information to be stored using a file known as a DMI file, so as to allow offline policy evaluation with offline processing of identities. The Studio evaluate policy feature accepts both a DMI file and a traffic capture file or a DME file. It should be appreciated that the name DMI is chosen arbitrarily to refer to the file format, and is not an acronym.

When DME/DMI creation is enabled, the network monitor generates DME files periodically during operation. In the preferred embodiment, the IAC emits a DMI file at regular intervals, e.g. every 15 minutes. This file contains those identities that are cached in the IAC subsystem for processing by policy from the previous interval.

The IAC generates a snapshot of its state. It does not need to keep a copy of every identity it processed during the last interval. Experience with identity enhanced monitoring has shown that identities are stable enough in the IAC over a short interval for offline processing.

Bubble Diagram

FIG. 7 is a bubble diagram display of user-group to critical business system according to the invention. This embodiment of the invention comprises a matrix display with larger and smaller bubbles and, in the presently preferred embodiment, includes colors for policy.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An identity enabled policy monitoring system, comprising:
   a network monitor device for receiving network traffic from a network under observation;
   an Identity Acquisition Manager (IAM), executing on a hardware processor communicatively connected to said network monitor, enabling said network monitor to perform a correlation analysis of user identities and said network traffic to infer which users and user groups are responsible for generating said network traffic and enabling said network monitor to store an Internet Protocol (IP) address of the network traffic in a cache of IP addresses when the correlation analysis performed at the network monitor indicates that there is no identity associated with the IP address, the IAM further configured to determine current login information, the current login information determined from login events and synthesized logout information, the synthesized logout information derived using a combination of timeouts and remote probing information, wherein the IAM distributes the current login information to one or more remote network monitors, wherein the remote probing is performed over the network, and wherein probing techniques include both identity aware and non-identity aware techniques, the identity aware techniques accessing an identity infrastructure associated with a device being probed to determine which users are currently logged into the device being probed, and the non-identity aware techniques analyzing network traffic indicated to have no identity associated with the IP address;
   an identity-enhanced policy having a priority ranking system for relationships based upon identities, said ranking based upon any of user identity, authenticated computer identity, group identity, and IP address; and
   a mechanism for connecting actively into the identity infrastructure of the network under observation to get information regarding identities and for passing said information regarding identities back to the IAM;
   wherein an identity-enhanced view of traffic is compared against a formal specification in said identity-enhanced policy; and
   wherein a human-readable report is generated indicating which traffic met and did not meet said identity-enhanced policy.

2. The identity enabled policy monitoring system of claim 1, wherein said mechanism for connecting actively comprises:
   a distributed logon collector (DLC).

3. The identity enabled policy monitoring system of claim 1, wherein an identity which served as a basis for authentication is carried forward during a session for purposes of policy enforcement.

4. A computer implemented distributed network monitoring method, the method comprising:
   providing a mapping from an Internet Protocol (IP) address to an identity;
   storing the IP address in a cache of IP addresses stored in a memory when the mapping indicates that there is no identity for the IP address;
   providing a formal policy definition based, at least in part, upon any of user names, authenticated computer names, user groups, and computer groups;
   examining network traffic, using a processor, in near real time with a passive network monitor to determine conformance with said formal policy definition; and
   providing an identity acquisition manager (IAM) module for determining which users are currently logged into computers on the network from login events and synthesized logout information, the synthesized logout information derived using a combination of timeouts and remote probing information, wherein the IAM distributes current login information to one or more remote network monitors, wherein the remote probing is performed over a network, and wherein remote probing techniques include both identity aware and non-identity aware techniques, the identity aware techniques accessing an identity infrastructure associated with a device being probed to determine which users are currently logged into the device being probed, and the non-identity aware techniques analyzing network traffic indicated to have no identity associated with the IP address;
   said passive network monitor indicating which network traffic is flowing on the network, and at least one of:
   which users were logged into workstations initiating the network traffic, the identity of computers initiating said network traffic, to which groups said users and/or computers belong and where said users and/or computers have previously authenticated to a network authentication infrastructure;
   which of said authenticated computers is receiving the network traffic; and
   which of the network traffic conforms to the formal policy definition.

5. The method of claim 4, wherein said network traffic comprises information about a flow of events within a small delay of the real time of those events, labeled with their actual time, such that the flow of events is equivalent to a real-time event flow.

6. The method of claim 4, wherein the mapping from IP address to identities is determined by querying a network authentication system for logon events, and by referencing a network directory to map logon information to user, computer, and group information.

7. The method of claim 6, wherein authenticated computer identities are also represented as special user accounts associated with authenticated computers on the network.

8. The method of claim 7, further comprising:
performing multiple logon disambiguation when multiple user or computer logons are detected.

9. The method of claim 4, further comprising:
providing at least one distributed logon collector (DLC) for performing queries into network identities sources under control of the IAM.

10. The method of claim 4, further comprising:
providing an identity-enhanced policy development tool for allowing an operator to describe formal policies about network connections between machines when described by any of:
machine IP address;
authenticated computer identity;
authenticated computer group identity;
user identity;
user group identity; and
combinations of the above.

11. The method of claim 10, further comprising:
providing an identity-enhanced policy engine for reading a policy from said identity enhanced policy development tool and for using said policy to annotate a near real time description of traffic with policy results.

12. The method of claim 4, further comprising:
providing a report showing traffic from groups to select computers which represent critical business systems, said report comprising a matrix display with larger and smaller bubbles and including colors for policy.

13. The method of claim 4, further comprising:
providing for multi-user computers where an IP address is associated with more than one concurrent directory user, and wherein multi-user computers are considered to have no individually identifiable users logged on and, thus, no user groups beyond those of which the computers themselves are members and an authenticated users built-in group; and
flagging multi-user computers, wherein a so-specified machine is always considered as a multi-user computer regardless of the number of users that are logged on concurrently, to ensure that policy applied to multi-user computers is applied consistently and deterministically regardless of the number of users logged on at that computer at any point in time.

14. The method of claim 4, further comprising:
ranking identity policy objects with respect to each other, as well as with respect to addressable network objects, to determine a relative priority of policy relationships and a network object's effective policy.

15. The method of claim 14, wherein said ranking of identity policy objects comprises in decreasing rank order:
a user object or a computer object;
a group object representing a user group, a computer group, or a custom group;
a built-in authenticated users group;
a built-in authenticated computers group;
a built-in anonymous group; and
ranking identity policy objects higher than any addressable network object;
wherein identity policy overrides host-based policy except for a prescriptive policy.

16. The method of claim 4 further comprising:
filtering the selection of available policy relationships using a current mapping from IP address to identity.

17. The method of claim 16, further comprising:
selecting a policy relationship based upon any of: whether said mapping has a single user identity, whether said mapping has multiple user identities, whether said mapping has a single authenticated computer identity, or whether said mapping has no identities.

18. The method of claim 4, further comprising:
arranging identity policy objects in a containment hierarchy to determine how policy defined for an object that is a policy relationship target is inherited by other objects that it contains.

19. The method of claim 4, further comprising:
delaying evaluation of network traffic from a particular IP address until such time as user-identities associated with source and destination IP addresses can be ascertained.

20. The method of claim 4, further comprising either of:
saving network event information offline in a file; or
capturing a sequence of packets from traffic data in the file; and
further comprising:
evaluating policy on data in said file offline; and
processing identities offline.

21. The method of claim 4, further comprising:
computing effective policy relationships for any given network object by:
determining a relative ranking of a relationships' services; wherein said ranking is based on said services' transport layer specifications;
for relationships that have identically ranked services, determining a ranking of said relationships' targets; and
for relationships that have identically ranked targets, determine a ranking of the relationships' initiators;
wherein a relationship with a higher ranking overrides a relationship with a lower ranking.

22. The method of claim 4, further comprising:
binding identity policy objects to zero, one, or more addressable network objects;
wherein an addressable network object or host comprises, directly or indirectly, an IP address space; and wherein if an identity policy object does not specify a host binding, the identity policy object is implicitly bound to an entire identity address space.

23. The method of claim 22, further comprising:
determining a relative ranking of two bound and otherwise identical identity objects; wherein said ranking is determined by the relative ranking of the addressable network objects to which they are bound.

24. A method comprising:
monitoring, in an identity acquisition manager, login state information of users logged into a network under observation, the login state information determined from login events and synthesized logout information, the synthesized logout information derived using a combination of timeouts and remote probing information, wherein the remote probing is performed over the network, and wherein remote probing techniques include both identity aware and non-identity aware techniques, the identity aware techniques accessing an identity infrastructure associated with a device being probed to determine which users are currently logged into the device being probed, and the non-identity aware techniques analyzing network traffic indicated to have no identity associated with the IP address;
receiving, in a passive network monitor, the login state information;

generating a local copy of the received login state information at the passive network monitor;

mapping, in accordance with the local copy of the login state information, an Internet Protocol (IP) address of the network under observation to an identity, wherein mapping an IP address of the network under observation includes storing the IP address in a cache of IP addresses stored in a memory when the mapping indicates that there is no identity associated with the IP address; and examining network traffic, using a processor, in near real time with a passive network monitor to determine conformance with said formal policy definition, wherein conformance is based on the IP address mapping, and wherein the formal policy definition is based upon one or more of user names, authenticated computer names, user groups, and computer groups.

25. The method according to claim 24, further comprising requesting updated login state information from the identity acquisition manager.

26. The method according to claim 24, wherein monitoring includes periodically transmitting updated login state information to the passive network monitor, and wherein generating includes updating the local copy of the login state information in accordance with the updated login state information.

27. A system comprising:
an identity-enhanced policy having a priority ranking system for relationships based upon identities, said ranking based upon one or more of user identity, authenticated computer identity, group identity, and IP address;
a network monitor device; and
an identity acquisition manager (IAM), executing on a hardware processor communicatively connected to said network monitor, to:
determine which users are logged into a network under observation;
determine a current login state of the users using login state information determined from login events and synthesized logout information, the synthesized logout information derived using a combination of timeouts and remote probing information, wherein the remote probing is performed over the network, and wherein remote probing techniques include both identity aware and non-identity aware techniques, the identity aware techniques accessing an identity infrastructure associated with a device being probed to determine which users are currently logged into the device being probed, and the non-identity aware techniques analyzing network traffic indicated to have no identity associated with the IP address;
store the current login state as logon data; and
periodically transmit the logon data to the network monitor;
wherein the network monitor:
stores a local copy of the logon data received from the IAM;
updates the local copy of the data when updates of the logon data are received from the IAM;
receives network traffic from the network under observation;
performs a correlation analysis of user identities in the logon data and the network traffic to infer which users and user groups are responsible for generating the network traffic;
stores an Internet Protocol (IP)address of the network traffic in a cache of IP addresses when the correlation analysis indicates that there is no identity associated with the IP address; and
applies the identity-enhanced policy.

* * * * *

UNITED STATES PATENT AND TRADEMARK OFFICE
CERTIFICATE OF CORRECTION

PATENT NO. : 8,584,195 B2
APPLICATION NO. : 11/854392
DATED : November 12, 2013
INVENTOR(S) : Kieran Gerard Sherlock et al.

Page 1 of 1

It is certified that error appears in the above-identified patent and that said Letters Patent is hereby corrected as shown below:

On the Title page, in item (57), in column 2, in "Abstract", line 14, after "identity" insert -- . --.

In the Claims:

In column 27, line 52, in claim 1, after "wherein" insert -- remote --.

In column 32, line 30, in claim 27, delete "(IP)address" and insert -- (IP) address --, therefor.

Signed and Sealed this
Fifteenth Day of April, 2014

Michelle K. Lee
*Deputy Director of the United States Patent and Trademark Office*